United States Patent [19]
Murib et al.

[11] 3,917,809
[45] Nov. 4, 1975

[54] PREPARATION OF BERYLLIUM HYDRIDES

[75] Inventors: Jawad H. Murib; Stuart Schott; Charles A. Bonecutter, all of Cincinnati, Ohio

[73] Assignee: National Distillers and Chemical Corporation, New York, N.Y.

[22] Filed: Sept. 30, 1968

[21] Appl. No.: 763,968

Related U.S. Application Data

[63] Continuation-in-part of Ser. No. 316,532, Oct. 16, 1963, abandoned.

[52] U.S. Cl.................................. 423/645; 149/109

[51] Int. Cl............................................. C01b 6/00
[58] Field of Search...................... 23/204; 423/645

[56]  References Cited
UNITED STATES PATENTS
3,483,219  12/1969  Shepherd....................... 149/109 X

*Primary Examiner*—Leland A. Sebastian
*Attorney, Agent, or Firm*—Allen A. Meyer, Jr.

[57] ABSTRACT

Beryllium hydride is prepared by disproportionation of a haloberyllium hydride-Lewis base complex.

7 Claims, No Drawings

PREPARATION OF BERYLLIUM HYDRIDES

This is a continuation-in-part of application Ser. No. 316,532, filed Oct. 16, 1963, and now abandoned.

Beryllium hydride is of considerable importance in powder metallurgy and in space and military applications as a high energy fuel component. Its insolubility in inert solvents, however, greatly hinders its being purified to the level required for its use. Previous attempts to obtain high purity beryllium hydride have not been successful. For example, impurities remained in the beryllium hydride obtained by the pyrolysis of di-t-butyl beryllium (prepared from Grignard reagent) at about 200°C. (G. E. Coates and F. Clockling, J. Chem. Soc., 1526 (1954), according to the equation $$(Me_3C)_2Be \cdot nEt_2O \rightarrow BeH_2 + 2CH_2 = CMe_2 + nEt_2O.$$

The removal of the impurities in the beryllium hydride obtained by the above method is difficult because of the insolubility of beryllium hydride in inert solvents.

It has now been found that high purity beryllium hydride can be prepared from a soluble form of a haloberyllium hydride, that is, from a Lewis base complex of haloberyllium hydride that has been formed by reacting a hydride of an alkali metal or an alkaline earth metal with a solution of a beryllium halide in the presence of a Lewis base.

In general a metal hydride or a complexed metal hydride, suspended or dissolved in an inert medium, is added to a stoichiometric equivalent of a beryllium halide in an inert solvent along with a Lewis base, the amount of the Lewis base being at least equimolar to the amount of the beryllium halide. The resulting mixture is agitated until the formation of insoluble by-product alkali metal halide or alkaline earth metal halide is essentially complete. The solution of the product haloberyllium hydride complex is then separated from the insoluble by-product halide by any convenient means.

The solution of the haloberyllium hydride can then be heated with distillation of the Lewis base, whereupon solid beryllium hydride, substantially free of impurities, is precipitated.

The preparation of haloberyllium hydride from a beryllium halide and an alkali metal hydride or an alkaline earth metal hydride is carried out, in accordance with the present invention, in the presence of a Lewis base at temperatures below 100°C. and in a closed system as illustrated by the following equation:

(Eq. 1) $MH + BeX_2 : Z_n \xrightarrow{<100°C.} XBeH : Z_n + MX$ wherein M is an alkali metal or an alkaline earth metal; X is a halogen selected from the group consisting of chlorine, bromine and iodine; Z is a Lewis base; and $n$ ranges between 0.5 and 2.

After completion of the reaction, the soluble haloberyllium hydride can be readily separated from the insoluble metal species (i.e., by-product MX and residual MH) by filtration thereby obtaining soluble $XBeH:Z_n$, free of alkali or alkaline earth metal ions. The product can then be disproportionated in a second step in the absence of metal ions to give solid $BeH_2$ and soluble $BeX_2$ according to the following equilibrium reaction:

(Eq. 2) $2 XBeH:Z_n \rightleftharpoons BeH_2 + BeX_2:Z + (2n-1)Z$ wherein X, Z and $n$ are as defined above in connection with Eq. 1.

The reaction in Eq. 2 can be shifted to the right direction by employing any method that facilitates removal of the Lewis base from the system. For example, distillation of the Lewis base at any temperature between about 25° to 175°C. leads to formation of solid beryllium hydride. Vacuum distillation of the Lewis base from the reaction mixture permits operation at low temperatures, for example, between 50° and 100°C. However, when the reaction (Eq. 2) is carried out in a closed system, i.e., without distillation of the Lewis base, high temperatures, i.e. above 100°C., are required to effect the disproportionation. It is preferred, however, to operate the disproportionation reaction (Eq. 2) at below 100°C. under vacuum in order to minimize incorporation of insoluble by-products in the final beryllium product. Thus, in the case of using diethyl ether as the Lewis base, the undesirable by-products include insoluble species derived from ether cleavage such as $XBeOC_2H_5$ and $HBeOC_2H_5$. Although these compounds are soluble in aromatic hydrocarbons, the occluded impurities could not be removed by extraction with these solvents. Therefore, it is preferred to employ temperatures at which cleavage of ether does not occur. In the case where the product $XBeH:OEt_2$ is prepared in aromatic hydrocarbons at relatively high temperatures, e.g. 100°C., any by-product of ether cleavage can be separated by stripping off the aromatic solvent and subsequent dissolution of the product in ether followed by filtration of the insoluble impurities and finally by distilling off the excess ether thereby obtaining pure haloberyllium hydride-etherate.

The beryllium halide suitable for the practice of this invention can be beryllium chloride, beryllium bromide, or beryllium iodide. It is possible to use instead of the halide other salts such as the alkoxides, e.g., beryllium methoxide or beryllium isopropoxide; the mercaptides, e.g., beryllium ethyl mercaptide or beryllium isobutyl mercaptide; and the like. When these beryllium salts are used it is preferred to use aromatic hydrocarbons as media for the reaction of Equation 1.

The metal hydride can be any simple alkali metal hydride, alkaline earth metal hydride, or mixture thereof, e.g., LiH, NaH, KH, CsH, $MgH_2$, and $CaH_2$, or complex metal hydride having the formula $M(HM'R_3)_n$ or $M(HM'(OR')_3)_n$, wherein M is an alkali metal or alkaline earth metal, M' is boron or aluminum, R is hydrogen, an alkyl radical having from 1 to about 5 carbon atoms or an aryl radical having from 6 to about 9 carbon atoms, R' is an alkyl radical having from 1 to about 5 carbon atoms or an aryl radical having from 6 to about 9 carbon atoms, and $n$ is one or two.

The Lewis base is an electron pair donor that does not contain an acidic hydrogen and can be selected from groups of dialkyl ethers such as dimethyl ether, diethyl ether, methylethyl ether, dipropyl ether, dibutyl ether, $\beta,\beta'$-dichloroethyl ether; diaryl ethers such as diphenyl ether, tolyl phenyl ether and ditolyl ether; alkyl aryl ethers such as anisole and ethyl phenyl ether; dialkyl sulfides such as dimethyl sulfide, diethyl sulfide, n-propyl sulfide, di-n-butyl sulfide and ethyl methyl sulfide; tertiary amines such as trialkylamines (trimethylamine, triethylamine and tri-n-propylamine), pyridines (2-ethyl pyridine and 2-n-propyl pyridine), piperidines (n-methyl piperidine, n-ethyl piperidine and n-propyl piperidine); and dialkyl aryl amines (dimethyl aniline, diethyl aniline and ethyl methyl aniline). In instances where it is desired to carry out the disproportionation reaction in conjunction with the preparation of the haloberyllium hydride, the use of one of the weaker Lewis bases, e.g., diethyl ether, methylphenyl ether, and dimethyl sulfide, is preferred so that the beryllium hydride obtained in the disproportionation reaction (Eq. 2) does not complex with the Lewis base present.

The selected solvent should be a solvent both for the beryllium halide reactant and the haloberyllium hydride product and must be chemically inert to both the reactant and the product. It should also be relatively volatile to permit easy removal from the product. Suitable media include saturated aliphatic hydrocarbons and aromatic hydrocarbons, such as kerosene, hexane, nonane, isooctane benzene, toluene, xylene, and mesitylene; inert chlorinated hydrocarbons, such as chlorobenzene, 2,4-dichlorotoluene, o- and p-chlorotoluene, o-chlorobenzene, p-dichlorobenzene, and o-xylyl chloride; and halogenated acyclic hydrocarbons, such as trichloroethylene and methylene dichloride; and the like; and mixtures of these.

It is also possible to have one of the Lewis bases listed above serve as part or all of the solvent in the haloberyllium hydride formation reaction (Eq. 1), in which case an amount of Lewis base in excess of that required to complex the beryllium halide is employed.

In carrying out the disproportionation reaction it is preferred that the reaction medium have a higher boiling point than any Lewis base present in order to be able to selectively remove the Lewis base by distillation.

Any solvent and Lewis base used in the process of the present invention must be free from moisture and peroxides. The beryllium halides should be anhydrous in order to avoid hydrolysis of the active hydride which would result in poor yields and conversions as well as low reaction rates.

The preferred molar ratio of metal hydride (M-H bonds) to the beryllium content in the reaction mixture is 1:1. At higher ratios of metal hydride, the intermediate HBeX tends to react with the excess metal hydride to prematurely form beryllium hydride (BeH$_2$) which would be difficult to separate from the insoluble metal halide being formed. Lower ratios of metal hydride lead to incomplete conversion of the beryllium halide and make the subsequent disproportionation reaction more difficult.

The amount of Lewis base used is at least equimolar to the amount of beryllium halide. Preferably, 2 or more moles of Lewis base per mole of beryllium halide are used.

The solvent should be used in a quantity sufficient to maintain in solution both the reactant beryllium halide-Lewis base complex and the product haloberyllium hydride-Lewis base complex.

The reaction in which the haloberyllium compound is found is generally carried out at a temperature at which its disproportionation is minimal, that is, in the range of about 0° to 100°C. and preferably in the range of about 25° to 85°C. The accompanying pressure need only be sufficient to maintain the solvent in liquid phase, and is preferably, but not necessarily, that which permits the removal of the Lewis base by distillation.

By the process of this invention beryllium hydride of high purity can be obtained, the solubility of haloberyllium hydrides in certain organic solvents offering an intermediate to BeH$_2$ by disproportionation to the insoluble solid BeH$_2$ and the soluble beryllium dihalide-Lewis base complex. The solubility of the latter in many inert organic solvents permits its used in a cyclic process.

The process of this invention also provides a means for the purification of beryllium hydride prepared by conventional methods. The crude beryllium hydride is reacted with a beryllium chloride, beryllium bromide, or beryllium iodide in the presence of an inert solvent and a Lewis base at a temperature within the range of about 0° to 100°C. and preferably within the range of about 25° to 85°C. to form a soluble haloberyllium hydride in accordance with the following equation:

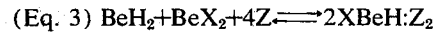

where X and Z are the same as defined for Equations 1 and 2. The ratio of the amount of beryllium halide to the amount of the beryllium hydride should be at least 1:1. Higher ratios of the halide accelerate solubilization of the beryllium hydride, but tend to hinder its subsequent recovery via disproportionation of the haloberyllium hydride in accordance with the process of Equation 2. A ratio of beryllium chloride to beryllium hydride of 1:1 is preferred. At least 2 moles, and preferably 3 to 4 moles, of Lewis base are used per mole of beryllium halide. For example, treatment of polymeric solid BeH$_2$ with beryllium chloride and a Lewis base, e.g., diethyl ether, in a ratio of 1:1:4 in solution in an inert solvents, e.g. toluene at 70°C. yields the soluble addition compound BeH$_2$·BeCl$_2$ ⇌ 2ClBeH, i.e., chloroberyllium hydride. Solubilizing BeH$_2$ in this manner provides a novel means of purification, allowing the isolation of high purity beryllium hydride by disproportionation of the chloroberyllium hydride in accordance with the reaction and conditions of Equation 2.

In addition, novel haloberyllium hydride-Lewis base complexes have been prepared. As discussed above, such complexes are useful in the preparation of pure beryllium hydride, useful in powder metallurgy and in high energy propellant formulations. Moreover, chloroberyllium hydride is useful as a reducing agent. Also chloroberyllium hydride can be reacted with olefins to form the corresponding mixed chloroberyllium alkyls which can then be disproportionated to beryllium alkyls and beryllium chloride, thus offering a novel route to beryllium alkyls other than by means of Grignard reagents. Further, beryllium alkyls are intermediates in the conventional preparation of beryllium hydride.

The following examples illustrate the preparation of a haloberyllium hydride-Lewis base complex and various ways of disproportionating such a complex to obtain pure beryllium hydride. Example VII illustrate vacuum disproportionation; Example VIII illustrates disproportionation in benzene; Example IX illustrates disproportionation in dimethyl sulfide; and Example X illustrate disproportionation by slow addition of the haloberyllium hydride-Lewis base complex to an evacuated zone.

EXAMPLE I 1.95 Grams of freshly distilled beryllium chloride dissolved in 90 ml. of dry dimethyl sulfide was placed in a 250 m. glass pressure bottle half-filled with stainless steel balls ⅛ inch in diameter. To this solution was added 0.61 g. of sodium hydride dispersed in 7.5 ml. of kerosene. The reaction mixture was ball-milled at ambient temperatures for 16 hours. The reaction mixture was then filtered and the clear filtrate analyzed. The filtrate contained 6.05 mmoles of soluble chloroberyllium hydride, ClBeH:2SMe$_2$, corresponding to a conversion of 24.9% based on the initial charge of beryllium chloride. Analysis by flame spectroscopy disclosed absence of sodium in the filtrate showing that all the sodium was retained in the solid phase and that the soluble chloroberyllium hydride was free of sodium.

EXAMPLE II

The procedure of Example I was repeated except that diethyl ether was used as the solvent instead of dimethyl sulfide. The reaction mixture consisted of 5.25 g. of beryllium chloride dissolved in 104.4 g. of diethyl ether and 1.71 g. of sodium hydride suspended in 6.8 g. of toluene. The mixture was ball-milled at room temperature for 3 days and filtered. Hydrolytic analysis of 29.13 g. sample of the clear filtrate gave the soluble atomic ratios of H:Be:Cl of 1.00:1.02:1.03 in contrast to theoretical values of 1:1:1 for HBeCl. H being an active hydrogen released as gaseous hydrogen on hydrolysis. Flame spectroscopy disclosed absence of sodium in the hydrolysate showing that the product was sodium-free chloroberyllium hydride.

Another sample (49.0 g.) of the filtrate was pumped in high vacuum at room temperature to remove the toluene and ether solvent. The residue was redissolved in 50 ml. of dry diethyl ether and filtered. A 19.2 g. sample of this ether solution was pumped overnight at 0°C. The non-volatile residue consisted of a colorless liquid which upon analysis gave an atom-mole ratio of beryllium to ether of 1.00:1.95, in good agreement with the theoretical value 1:2 for the dietherate, $ClBeH:2O(C_2H_5)_2$. A second sample (14.56 g.) of the ether solution was pumped at 0°C. to distill off the excess ether. The liquid residue was then pumped in high vacuum ($10^{-4}$ mm. Hg) at room temperature for 4 hours. The non-volatile residue was colorless liquid which exhibited an atom-mole ratio of beryllium to ether of 1.00:0.96 in contrast to the theoretical ratio 1:1 for the monoetherate, $ClBeH:O(C_2H_5)_2$. Continued pumping at 30°C. for additional 12 hours resulted in the loss of more ether, leaving a solid residue with a beryllium to ether ratio of 1.00 to 0.52.

A. When Example II was repeated, using trimethylamine instead of diethyl ether, the product was soluble chloroberyllium hydride-trimethylaminate.

B. When Example II is repeated using $BeBr_2$ instead of $BeCl_2$, soluble bromoberyllium hydride-diethyl etherate is obtained.

C. When Example II is repeated using $BeI_2$ instead of $BeCl_2$ the product is soluble iodoberyllium hydride-diethyl etherate.

EXAMPLE III

The procedure of Example I was repeated except that a mixed solvent was used consisting of 80% by volume of anisole, 15 percent of diethyl ether, and 5% of kerosene. Soluble chloroberyllium hydride was obtained, demonstrating the use of alkyl-aryl ethers as solvents.

EXAMPLE IV

The procedure of Example II was repeated except that lithium hydride was reacted with beryllium chloride, giving an ether-soluble chloroberyllium hydride.

EXAMPLE V

A mixture consisting of 114.8 g. of beryllium chloride, 198.8 g. of diethyl ether, 36.8 g. of sodium hydride and 735.2 g. of benzene was heated in a stirred pressure reactor at 90°C. for 11 hours. The reaction mixture was cooled to room temperature and filtered. A 1.41 g. sample of the filtrate was analyzed. The soluble ratios of H:Be:Cl were 0.955:1.00:1.09 compared to the theory 1:1:1 for HBeCl.

EXAMPLE VI

A mixture of 8.2 g. of beryllium chloride, 150 ml. of diethyl ether, 5.0 g. sodium hydride and 25 g. of kerosene was charged to a 300 ml. pressure reactor. The reaction mixture was stirred and heated at 130°C. for 24 hours. After cooling to room temperature the mixture was filtered and the filtrate analyzed. The filtrate contained a trace amount of beryllium chloride but no soluble hydride, indicating that under these reaction conditions essentially all the beryllium content was retained in the solid phase as $BeH_2$ in admixture with by-product NaCl and residual NaH. Isolation of beryllium hydride from the solid phase was not possible because $BeH_2$, NaCl and NaH are all insoluble in diethyl ether.

EXAMPLE VII

A mixture containing 41% $ClBeH:OEt_2$ and 59% $BeCl_2:OEt_2$ was pumped in high vacuum at 63°C. for 2 days. The non-volatile residue was thoroughly mixed with benzene and the resulting suspension transferred to a Soxhlet extractor equipped with a fritted disc and with syrum-capped side arms. The mixture was filtered and the soluble chloride was extracted with dimethyl sulfide for three days. A sample of the insoluble solid suspended in dimethyl sulfide was transferred via a syringe to a tared 50 ml. round bottom flask provided with a 2mm. Teflon needle valve (Fisher-Porter Model No. 795-005), a Teflon coated magnetic stirrer, and an O-ring ball joint. The flask was attached to the vacuum line through the ball joint and the solvents were removed by pumping in high vacuum at room temperature and finally by heating at 101°C. overnight. The flask was cooled to room temperature, filled with nitrogen, weighed and the contents hydrolyzed with dilute acetic acid in the presence of toluene. The hydrogen evolved was passed through 3 U-tubes cooled at −196°C., collected in a calibrated volume by means of a Toepler pump and measured. The hydrolysate and the −196°C. condensate were combined and analyzed for beryllium, chloride and ether. The product contained 81.5 wt. % $BeH_2$ with 1.2 wt. % $(C_2H_5)_2O$ and 5.8 wt. % Cl (H/Cl ratio = 90/1).

EXAMPLE VIII

A mixture of 139.2 mmoles $ClBeH:OEt_2$ and 19.0 mmoles $BeCl_2OEt_2$ was dissolved in 171 g. benzene. The solution was vacuum-distilled at 65°C with total take-off, utilizing benzene vapor as a carrier for the evolved ether. Fresh benzene solvent was added periodically to maintain the by-product $BeCl_2:OEt_2$ in solution. The distillation was continued for 5 hours, collecting the distillate in a receiver cooled by dry ice-acetone. The reaction mixture was filtered and the insoluble $BeH_2$ residue was subjected to Soxhlet extraction with dimethyl sulfide for 23 hours. A sample of the solid suspension was withdrawn, and vacuum-dried at 70°C. for 15 hours. Analysis showed a product purity of 69% $BeH_2$ with 8.2 wt. % Cl (H/Cl ratio of 54/1) and 11.0 wt. % $Et_2O$. A second sample was withdrawn and vacuum-dried at 97°C. It gave a purity of 77 wt. % $BeH_2$ with 3.6 wt. % $Et_2O$ and 7.8 wt. % Cl (H/Cl ratio = 63/1).

EXAMPLE IX

A sample of 129.5 mmoles of ClBeH-etherate in admixture with $BeCl_2:OEt_2$ with observed ratios of $H:Be:Cl:Et_2O$ of 1.0:1.2:1.3:1.2 was added to 130 ml. dimethyl sulfide at room temperature. The resulting solid was filtered and extracted with benzene for 2 days. The insoluble residue, suspended in benzene, was transferred to a tared hydrolysis flask and the solvent distilled under vacuum at room temperature. The solid residue was heated at 108° with pumping in high vacuum for 16 hours. Hydrolytic analysis showed the product to be 90 wt. % $BeH_2$.

EXAMPLE X

A sample consisting of 316 mmoles ClBeH: $OEt_2$, 58.2 mmoles $BeCl_2:OEt_2$ and 94.2 mmoles of $Et_2O$ was dissolved in 68 grams of benzene. The solution was added incremetally (1–5 ml.) to an evacuated flask heated at 65°–70°C. After each addition the mixture was stirred for 1–2 minutes in a closed system and then rapidly evacuated to remove ether and benzene. The intermittant addition was continued for 6.0 hours after which the reaction mixture was vacuum heated at 55°C. for an additional 8 hours. The ether and benzene were condensed in two traps cooled at −80° and −196°C. The amount of ether evolved was found to be 256 mmoles in good agreement with 252.2 mmoles expected from summation of 158 mmoles resulting from disproportionation of (316 mmoles) $ClBeH:OEt_2$ plus 94.2 mmoles present in the initial sample as excess $Et_2O$.

The solid reaction mixture was then thoroughly mixed with 125 ml. benzene to solubilize the $BeCl_2:OEt_2$ and residual $ClBeH:OEt_2$ and the resulting suspension was filtered. The filtrate contained 87.7 mmoles of $ClBeH:OEt_2$. This corresponded to 72% disproportionation.

Repetition of this experiment starting with more dilute solution of $ClBeH:OEt_2$ (0.6 molar) in benzene resulted in 87% conversion based on consumption of soluble hydride.

Residual soluble chloride was extracted with dimethyl sulfide. The dimethyl sulfide extract contained no soluble hydride. A sample of the insoluble solid was vacuum heated at 135°C. for 15 hours and gave a purity of 74.1 wt. % $BeH_2$ with 10.7 wt. % Cl and 5.0 wt. % $Et_2O$.

There are disclosed above a number of embodiments of the invention herein presented, however, it is possible to produce still other embodiments without departing from the inventive concept herein disclosed. It is desired, therefore, that only such limitations be imposed on the appended claims as are stated therein.

What is claimed is:

1. A process for the production of beryllium hydride which comprises disproportionatng a haloberyllium hydride-Lewis base complex having the formula:

$$XBeH:Z_n$$

wherein X is a halogen selected from the group consisting of chlorine, bromine and iodine, Z is a Lewis base which does not contain a protonic hydrogen and n is 0.5 to 2, and recovering solid beryllium hydride.

2. The process of claim 1 wherein Z is selected from the group consisting of dialkyl ethers, diaryl ethers, alkyl aryl ethers, dialkyl sulfide and tertiary amines.

3. The process of claim 1 wherein Z is diethyl ether, dimethyl sulfide or trimethyl amine.

4. The process of claim 1 wherein X is chlorine.

5. The process of claim 1 wherein X is bromine.

6. The process of claim 1 wherein said disproportionation is effected by heating said haloberyllium hydride-Lewis base complex at a temperature below about 100°C under vacuum thereby distilling off Lewis base.

7. The process of claim 1 wherein said disproportionation is effected by heating said haloberyllium hydride-Lewis base complex at a temperature above about 100°C. thereby removing the Lewis base.

* * * * *